United States Patent
Goetzel et al.

(10) Patent No.: US 9,417,651 B2
(45) Date of Patent: Aug. 16, 2016

(54) WORK APPARATUS

(71) Applicant: Andreas Stihl AG & Co. KG, Waiblingen (DE)

(72) Inventors: Arne Goetzel, Klingenthal (DE); Juergen Haeberlein, Murrhardt (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 408 days.

(21) Appl. No.: 14/107,825

(22) Filed: Dec. 16, 2013

(65) Prior Publication Data

US 2014/0166325 A1    Jun. 19, 2014

(30) Foreign Application Priority Data

Dec. 14, 2012   (DE) .......................... 10 2012 024 481

(51) Int. Cl.
  *G05G 5/04*  (2006.01)
  *F02D 11/02*  (2006.01)

(52) U.S. Cl.
  CPC . *G05G 5/04* (2013.01); *F02D 11/02* (2013.01)

(58) Field of Classification Search
  CPC ............ G05G 5/04; F16K 31/46; F02D 11/02
  USPC .................................................. 173/170, 171
  See application file for complete search history.

(56) References Cited

U.S. PATENT DOCUMENTS

| | | | | |
|---|---|---|---|---|
| 4,798,185 A | * | 1/1989 | Driggers ................ | A01D 34/90 123/400 |
| 5,765,445 A | * | 6/1998 | Miyata ..................... | G05G 1/04 56/DIG. 18 |
| 5,842,277 A | * | 12/1998 | Haberlein .............. | A01G 3/062 173/171 |
| 6,666,187 B2 | * | 12/2003 | Dahlberg ................ | F02D 11/02 123/396 |

* cited by examiner

*Primary Examiner* — Nathaniel Chukwurah
(74) *Attorney, Agent, or Firm* — Walter Ottesen, P.A.

(57) ABSTRACT

A work apparatus has a drive motor for driving a work tool and has a control unit for the drive motor. The operating device includes an actuating element actuated by a user. The actuating element is mounted in a movable manner in a housing and can be adjusted in an actuating direction between a zero position and a maximum position. An intermediate stop acts between the zero position and the maximum position. The position of the intermediate stop is settable via a setting element. After the intermediate stop has been reached, the actuating element can be actuated further as far as the maximum position. The operating force (F) for further actuating the actuating element increases when the intermediate stop is reached. Provision is made for the operating force (F) to drop again upon further actuation of the actuating element after the intermediate stop has been overcome.

19 Claims, 7 Drawing Sheets

WORK APPARATUS

CROSS REFERENCE TO RELATED APPLICATION

This application claims priority of German patent application no. 10 2012 024 481.9, filed Dec. 14, 2012, the entire content of which is incorporated herein by reference.

BACKGROUND OF THE INVENTION

In work apparatuses, such as brushcutters or the like, for example, it is desirable, for some applications, to operate the work apparatus at a constant speed which is reduced with respect to the maximum speed in order to achieve the desired cutting result. U.S. Pat. Nos. 6,666,187 and 5,765,445 disclose a settable intermediate stop for the throttle lever, it being possible by way of the intermediate stop for the operator to easily hold the throttle lever in a partially actuated position. The intermediate stop includes a spring. Once the intermediate stop has been reached, the throttle lever can be actuated further counter to the spring force. To this end, high operating forces have to be applied. Also, in order to keep the throttle lever for example in the full throttle position, the operator has to hold the throttle lever counter to the force of the spring of the intermediate stop. As a result, it is tiring for the operator to work above the speed defined by the intermediate stop.

SUMMARY OF THE INVENTION

It is an object of the invention to provide a work apparatus of the above type with which it is possible to work even at high speeds without fatigue and which facilitates working easily at various reduced speeds.

Provision is made for the operating force to drop again upon continued actuation of the operating element after the intermediate stop has been overcome. In order to work at a speed above the speed which is defined by the intermediate stop, the operator thus does not have to permanently apply the force necessary for overcoming the stop, but rather only a much lower operating or actuating force. This operating force corresponds advantageously to the usual actuating force of an operating element, for example a throttle lever, without a corresponding intermediate stop. The force for actuating the operating element usually rises in a linear manner along the operating travel.

Advantageously, the force rises strongly compared with this linear characteristic when the intermediate stop is reached and drops back to a linear characteristic once the intermediate stop has been overcome. As a result, a great increase in force can be achieved in order to overcome the intermediate stop.

On account of the intermediate stop, a desired operating point for the work apparatus is settable. In this case, the intermediate stop is advantageously also settable during operation. In particular, it is possible to reset the throttle lever in the direction of lower speeds by adjusting the intermediate stop. As a result, a desired operating point can be set precisely during operation. It is possible to adjust the throttle lever via the setting element of the intermediate stop when the force required to overcome the intermediate stop is located considerably above the actuating force that is required before and after the intermediate stop is reached. Since the operating force drops again after the intermediate stop has been overcome and does not have to be applied permanently by the operator, this force can be designed to be correspondingly high.

Since the position of the intermediate stop is settable, it is easily possible to work at different reduced speeds. The position of the setting element is advantageously settable independently of the position of the operating element. The setting element can in this case be arranged on the operating element and be settable with respect to the operating element. However, the position, given by the setting element, for the intermediate stop is independent of the position of the operating element. Advantageously, the setting element and the operating element are arranged in a manner spatially separated from one another.

The operating force after overcoming the intermediate stop is advantageously less than half, in particular less than a quarter of the maximum operating force when overcoming the intermediate stop. The intermediate stop is advantageously formed by a first stop element connected to the operating element and a second stop element connected to the housing. In this case, in order to set the intermediate stop, the position of the first stop element may be adjustable relative to the operating element or the position of the second stop element may be adjustable relative to the housing. The stop elements move advantageously along the entire operating travel of the operating element from the zero position to the maximum position relative to one another. The zero position of the operating element is in this case the unactuated position of the operating element and the maximum position is the maximally actuated position. The maximum position may be given structurally for example by a stop. The intermediate stop is accordingly not moved by the operating element, but rather the operating element overcomes the intermediate stop, with the result that the actuating force can drop again after the intermediate stop has been overcome.

Advantageously, one of the stop elements is a sprung element and the other stop element is a stop surface. When the intermediate stop is overcome, the sprung element is advantageously elastically deformed and moved over the mechanical intermediate stop. Once the sprung element has been moved over the mechanical stop, the operating force drops again. The spring element is in this case advantageously defined in a very stiff manner, and thus has a high spring constant. As a result, it is easily possible to achieve a very considerable increase in the required operating force at the intermediate stop. Advantageously, the position of the sprung element is settable. However, provision can also be made for the position of the stop surface to be settable in order to set the intermediate stop.

The stop surface is advantageously inclined at an angle of more than 45° to the direction of movement of the sprung element when reaching the stop surface, that is to say to the direction in which the sprung element moves when reaching the stop surface. The inclination angle is advantageously more than about 70°, in particular between about 75° and about 85°. As a result, the intermediate stop is clearly perceptible to the operator even during operation, when considerable vibrations may occur. Since the actuating force for overcoming the intermediate stop has to be applied only very briefly and the operating force subsequently drops again, a comparatively high operating force for overcoming the intermediate stop is acceptable.

A simple design is obtained if the sprung element slides along a sliding surface during actuation of the operating element. The sliding surface advantageously has a first section located upstream of the stop surface in the actuating direction and a second section located downstream of the stop surface in the actuating direction. The section located upstream of the stop surface in the actuating direction is in this case the section against which the sprung element abuts when the operating element is located upstream of the intermediate stop, and the second section of the sliding surface is the section against which the sprung element abuts when the intermediate stop has been overcome. Advantageously, the stop surface forms a ramp between the two sections of the sliding surface. When the operating element is released, the intermediate stop is as a result not perceptible or only perceptible a little and the operating element, when it is released, is restored to its zero position, advantageously on account of the force of a restoring spring. In this case, the sliding surfaces in the first and second sections extend advantageously in a manner approximately parallel to the direction of movement of the sprung element. If the sprung element carries out a linear movement, then the two sections of the sliding surface advantageously extend in a planar manner. If the sprung element moves along an arcuate path, then the sliding surfaces are advantageously arcuate with a corresponding radius in each case. The direction of movement extends in this case at a tangent to the sliding surface. In order to achieve a larger operating force and restoring force in the second section, provision is advantageously made for the sliding surface to extend in an inclined manner in the second section with respect to the direction of movement of the sliding surface. A simple structure is obtained if the sliding surface is mounted so as to be pivotable about a pivot axis. The distance of the abutment surface of the sprung element on the sliding surface from the rotational axis increases in this case advantageously in a continuous manner when the operating element moves in the actuating direction.

It is possible to set the position of the intermediate stop in a precise manner when the setting element acts on at least one of the two stop elements via an actuating gear. The actuating gear is in this case a gear which converts the travel of the setting element into a different, in particular much smaller travel of one of the stop elements. A simple design is obtained if the actuating gear includes a positioning pin which is guided in a positioning groove. In this case, the positioning groove extends advantageously in a spiral manner. Advantageously, more than one revolution of the setting element is required to adjust the intermediate stop from a position next to the zero position of the operating element to a position next to the maximum position of the operating element. Advantageously, it is possible to adjust the intermediate stop in the entire region between the zero position and the maximum position. The position of the intermediate stop is adjustable in particular in a stepless manner so that the intermediate stop can be placed in any position between the zero position and the maximum position.

Advantageously, the positioning groove is formed on the setting element and the positioning pin is connected fixedly to one of the stop elements. The setting element acts in particular on the second stop element which is movable in the actuating direction of the operating element in order to adjust the intermediate stop. A simple, compact arrangement is achieved if the operating element is mounted so as to be pivotable about a pivot axis and the second stop element is pivotable about the pivot axis of the operating element in order to adjust the intermediate stop.

It is possible to mount the settable intermediate stop easily if the housing is a handle housing which is formed from at least two part-shells, wherein the operating element, the setting element, the actuating gear and the stop elements are mounted and fixed in a common part-shell of the handle housing.

Advantageously, this part-shell of the handle housing can be connected to a conventional further part-shell of a handle housing. As a result, a work apparatus having a settable intermediate stop can be formed in an identical manner to a work apparatus without a settable intermediate stop, apart from the part-shell of the handle housing in which the operating element, the setting element, the actuating gear and the stop elements are arranged. It is also easily possible to retrofit a settable intermediate stop as a result.

Advantageously, the operating element is a throttle lever which includes an actuating section which is intended to be actuated by the operator, and an attachment section to which a transmission element for transmitting the actuating movement of the throttle lever to the drive motor can be secured. The relative position of the actuating section and the attachment section is advantageously settable. As a result, the length of the transmission element, in particular of a throttle cable, can easily be adjusted. Advantageously, a stop element is secured to the actuating section. As a result, the intermediate stop acts directly on the actuating section of the throttle lever, which the operator actuates.

The operating element is advantageously spring-loaded in the direction of its zero position, that is to say its unactuated position. As a result, the operating element is restored to the zero position when it is released. The operating force which is required to adjust the operating element by an adjustment travel is advantageously approximately of the same magnitude before the intermediate stop is reached and after the intermediate stop has been overcome, that is to say on both sides of the intermediate stop in the actuating direction. Restoring to the unactuated position accordingly takes place without additional force by the intermediate stop solely on account of the usual spring loading of the actuating element. However, it is also possible for different required operating forces to be provided before the intermediate stop is reached and after it has been overcome. In this case, the operating force which is required to adjust the operating element by an adjustment travel before the intermediate stop is reached is advantageously smaller than the operating force which is required after the intermediate stop has been overcome. The force acting on the operating element per operating travel is accordingly greater after the intermediate stop has been overcome than before the intermediate stop is reached. After the intermediate stop has been overcome, a greater force per adjustment travel is accordingly required in order to adjust the operating element in the direction of its completely actuated position. As a result, the user can perceive better the reaching and overcoming of the intermediate stop.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
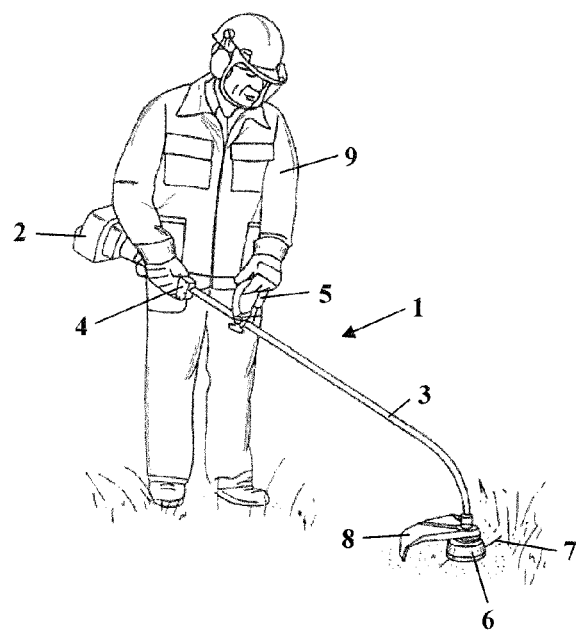
FIG. 1 shows a schematic illustration of a brushcutter guided by an operator.

FIG. 1 shows a handheld work apparatus, specifically a brushcutter 1, as an exemplary embodiment for a work apparatus. However, the design, described in the following, of an intermediate stop may advantageously also be used in other work apparatuses, in particular in other handheld work apparatuses, in particular in spraying devices, blowing devices, hedge trimmers, olive harvesters or the like. In the case of blowing devices and spraying devices, the work tool is the impeller delivering the stream of working air. In harvesting devices, such as olive harvesters or the like, the work tool is formed by the moving fingers, hooks or the like engaging in the tree or bush.

The brushcutter 1 has a motor housing 2 in which a drive motor, not shown in FIG. 1, is arranged. The motor housing 2 is connected via a guide wand 3 to a mowing head 6 from which a cutting filament 7 projects. The mowing head 6 is driven in rotation. The pitch circle of the cutting filament 7 is partially covered by a guard 8. Secured to the guide wand 3 are a handle 4 and a bow-type handle 5, by way of which an operator 9 holds and guides the brushcutter 1. The guide wand 3 projects through the handle 4. Instead of the handle 4 and bow-type handle 5, a handlebar may be secured to the guide wand 2, and the handle 4 may be plugged onto one of the ends of the handlebar.

Figure 2:
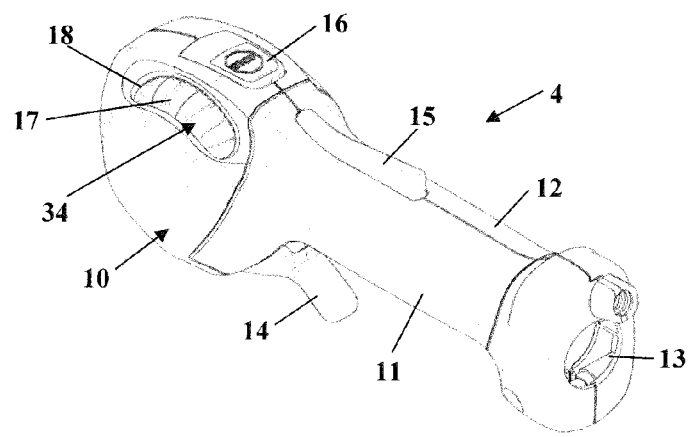
FIG. 2 shows a perspective view of the handle of the brushcutter from FIG. 1.

FIG. 2 shows the handle 4 in detail. The handle 4 is constructed from two part-shells 11 and 12 which together delimit an opening 13 for the guide wand 3. The part-shells 11 and 12 are connected together in a partition plane which extends in the longitudinal direction of the guide wand 3. The part-shells 11 and 12 together form a handle housing 10. Mounted pivotably on the handle housing 10 is a throttle lever 14. On that side of the handle housing 10 that is located opposite the throttle lever 14, a throttle lever lock 15 projects out of the handle housing 10, the throttle lever lock 15 likewise being mounted pivotably on the handle housing 10. The handle 4 has a stop switch 16 and also a setting element 17. Adjacent to the stop switch 16, the handle housing 10 has a cutout 18 which frees the setting element 17 arranged in the handle housing 10 such that the setting element 17 can be actuated by the operator 9. The setting element 17 has fluting 34 which allows easy adjustment of the setting element 17. A different surface structure of the setting element 17 may also be advantageous.

Figure 3:
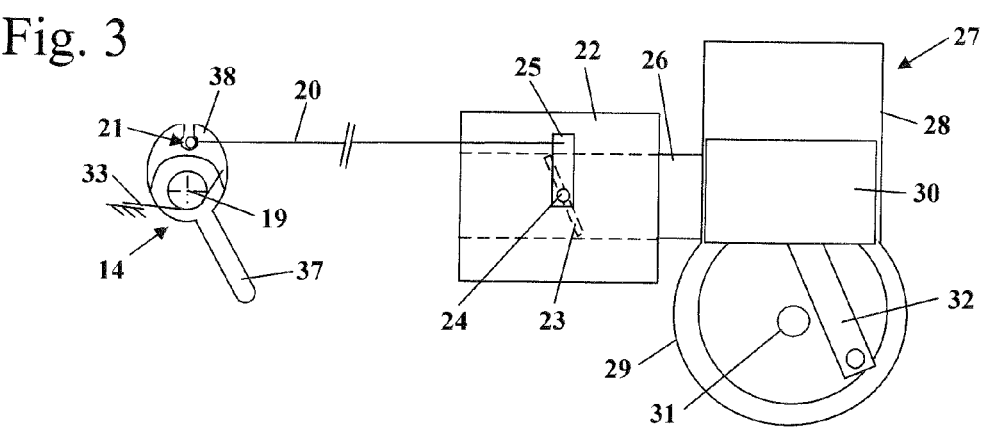
FIG. 3 shows a schematic of the operating device and of the drive motor of the brushcutter.

As FIG. 3 schematically shows, the throttle lever 14 has an actuating section 37 and an attachment section 38. The two sections 37 and 38 are mounted pivotably about the same pivot axis 19. A restoring spring 33, which restores the actuating section 37 and thus also the attachment section 38 to its zero position when the operator 9 is not actuating the actuating section 37, acts on the actuating section 37. Formed on the attachment section 38 is a receptacle 21 for a throttle cable 20, the throttle cable 20 being fitted at the receptacle 21. The two sections 37 and 38 of the throttle lever 14 are adjustable relative to one another in order to set the length of the throttle cable 20.

As FIG. 3 shows, the drive motor is in the form of a combustion engine 27, in particular a single cylinder engine. The combustion engine 27 is advantageously a two-stroke engine or a mixture-lubricated four-stroke engine. However, the drive motor may also be an electric motor which is supplied with power in particular via a power cable, a battery or a storage battery. The combustion engine 27 has a cylinder 28 in which a piston 30 is mounted in a reciprocating manner. The piston 30 drives a crankshaft 31, mounted in a rotatable manner in the crankcase 29, in rotation via a connecting rod 32. The crankshaft 31 drives the work tool of the work apparatus, in the exemplary embodiment the mowing head 6 of the brushcutter 1.

In order to supply fuel/air mixture, an intake channel 26, the inlet opening of which is advantageously slot-controlled by the piston 30, opens into the combustion engine 27. The intake channel 26 is guided at least partially in a carburetor 22, in which fuel is supplied to the drawn-in combustion air. A throttle flap 23 having a throttle shaft 24 is mounted pivotably in the carburetor 22. A throttle trigger 25, on which the throttle cable 20 acts, is fixed to the throttle shaft 24 on the outer side of the housing of the carburetor 22. Instead of a carburetor 22, a throttle housing for the throttle flap 23 may also be provided, and the fuel can be supplied separately, for example via an injection valve, directly into the crankcase 29, into the intake channel 26 or into the cylinder 28.

Figure 4:
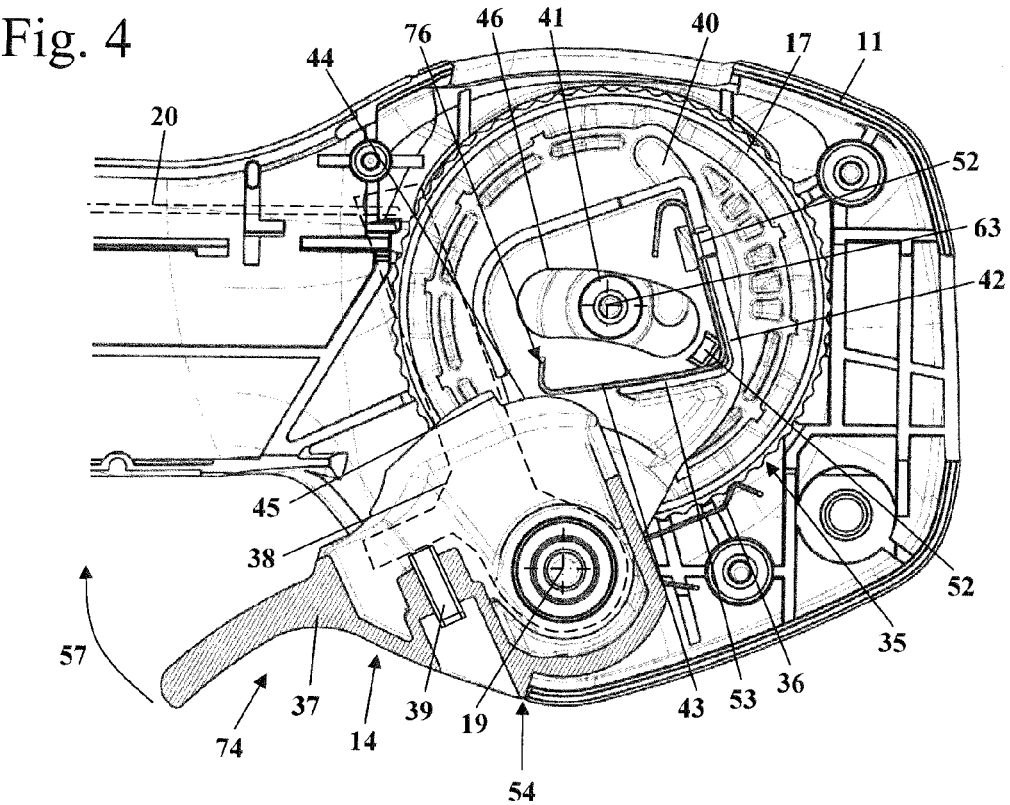
FIG. 4 shows a section through the handle in the region of the throttle lever in the zero position of the throttle lever.

In the case of a brushcutter 1, it is frequently desirable not to operate the combustion engine 27 at maximum speed, but rather at a reduced speed, in order to achieve an optimum cutting result. In order to make it easier to hold the throttle lever 14 in an only partially actuated position over a relatively long period of time, an intermediate stop 55 (FIG. 6) is provided, the position of which can be set via the setting element 17. As FIG. 4 shows, the setting element 17 is in the form of an adjusting wheel which bears a spiral positioning groove 40 on its side directed into the interior of the handle housing 10. A positioning lug 58 (FIG. 9) engages in the positioning groove 40, the positioning lug 58 being fixed to a retaining element 42.

As FIG. 4 shows, the retaining element 42 is mounted so as to be pivotable about the pivot axis 19 of the throttle lever 14 and has a guide slot 46 into which a guide pin 41 projects. The guide pin 41 is advantageously formed by the head of an attachment screw for the setting element 17. The guide slot 46 extends in the form of a circular arc around the pivot axis 19. Secured to the retaining element 42 is a spring 43. The spring 43 is in the form of a leaf spring and is fixed to the retaining element 42 via retaining webs 52. The spring 43 has a free end 76 at which the spring 43 is formed in a curved manner. The free end 76 of the spring 43 abuts against a sliding surface 44 which is formed on the actuating section 37 of the throttle lever 14. The sliding surface 44 extends approximately in the form of a circular arc around the pivot axis 19. The spring 43 consists preferably of metal, in particular of spring steel. However, it may also be advantageous to form the spring 43 from plastics material.

On its outer circumference, the setting element 17 has a latching contour 35, shown in FIG. 4, which interacts with a latching spring 36. Latching positions of the setting element 17 are defined as a result. As a result of the arrangement on the outer circumference of the setting element 17, there is a very small setting angle between two latching steps. The positioning groove 40 and the positioning lug 58 (FIG. 9) on the retaining element 42 form an actuating gear which makes it possible to set the position of the intermediate stop 55 (FIG. 6) in a very precise manner. Provision may also be made for the latching contour 35 to be arranged on an inner circumference of the setting element 17.

FIG. 4 also shows the structural design of the actuating section 37 and the attachment section 38. The attachment section 38 is likewise mounted so as to be pivotable about the pivot axis 19. A setting screw 39, which is screwed into the actuating section 37 and abuts against the attachment section 38, acts between the actuating section 37 and the attachment section 38. By rotating the setting screw 39, the position of the throttle flap 23, with the throttle lever 14 unactuated, can be altered and as a result set. This makes it possible to ensure that, when the throttle lever 14 is pivoted, it is possible to pivot the throttle flap 23 fully from the closed position into the completely open position. The idling position of the throttle flap 23, that is, the position in which the throttle flap 23 is arranged when the throttle lever 14 is unactuated, can be adjusted. As FIG. 4 shows, a zero stop 54, against which the throttle lever 14 abuts in the zero position 74 shown in FIG. 4 on account of the force of the restoring spring 33 (FIG. 3), is formed between the actuating section 37 and the part-shell 11. In order to accelerate, the actuating section 37 is actuated in an actuating direction 57.

Figure 5:
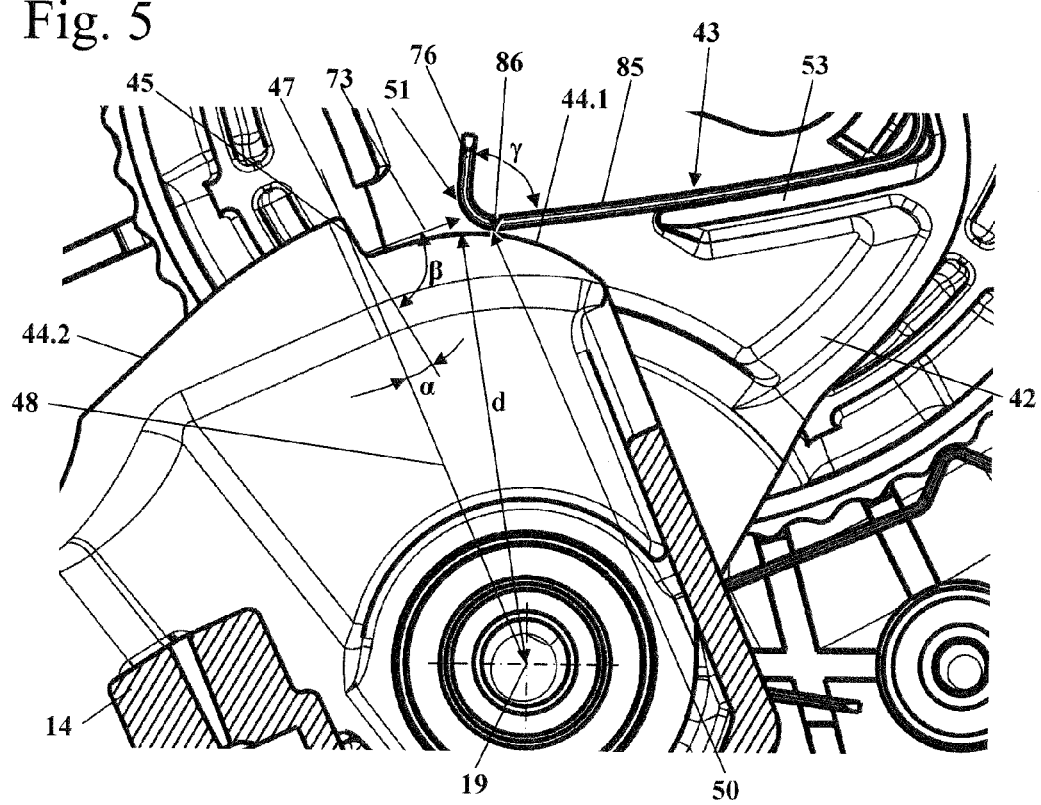
FIG. 5 shows an enlarged detail from FIG. 4.

As FIG. 5 shows, the sliding surface 44 has a first section 44.1 against which the spring 43 abuts by way of a first abutment region 50 in the zero position 74 of the throttle lever 14. The abutment region 50 abuts against an abutment point 86 of the sliding surface 44. The sliding surface 44 furthermore has a second section 44.2. Arranged between the first section 44.1 and the second section 44.2 is a stop surface 45 which forms a ramp between the two sections 44.1 and 44.2. In this case, the first section 44.1 is at a shorter distance from the pivot axis 19 than the second section 44.2. The stop surface 45 is inclined at an angle $\beta$ with respect to the direction of movement 73 in which the sliding surface 44 moves relative to the spring 43 when the throttle lever 14 is actuated, the angle $\beta$ advantageously being more than 45°. The angle $\beta$ is advantageously more than 65°, in particular more than 70°. An angle $\beta$ of about 75° to about 85° is considered to be particularly advantageous. The distance (d) of the first section 44.1 of the sliding surface 44 from the rotational axis 19 is in this case constant over the entire section 44.1. When the throttle lever 14 is adjusted, the distance by which the spring 43 is tensioned does not change, as long as the spring 43 is in abutment in the first section 44.1.

The stop surface 45 merges at one end 47 into the second section 44.2 of the sliding surface 44. The connection of the pivot axis 19 to the end 47 encloses an angle $\alpha$ with the stop surface 45, the angle $\alpha$ being approximately 8° to approximately 10° in the exemplary embodiment. The angle $\alpha$ is advantageously less, in particular much less than 45°. As FIG. 5 also shows, the spring 43 has a second abutment region 51 which is located opposite the stop surface 45. The abutment region 50 is arranged on the straight section 85 adjacent to the bent end 76. The end 76 of the spring 43 is bent. The end 76 encloses an angle $\gamma$ with the straight section 85, the angle $\gamma$ being advantageously at least 80°. The end 76 merges with a radius into the adjoining straight section 85. The abutment region 51 is arranged in the region between the end 76 and the adjoining straight section 85 in which the spring 43 extends in a curved manner. The curved configuration of the spring 43 between the end 76 and the section 85 prevents the spring 43 from being able to catch on the stop surface 45. The curved configuration ensures in a simple manner that the stop surface 45 exerts a force on the spring 43 in the direction of the second section 44.2 of the sliding surface 44 and the spring 43 is elastically deformed when the throttle lever 14 is pivoted further in the actuating direction 57. Formed on the retaining element 42 is an abutment web 53 against which the spring 43 can abut when the first abutment region 50 abuts against the first section 44.1 of the sliding surface 44.

Figure 6:
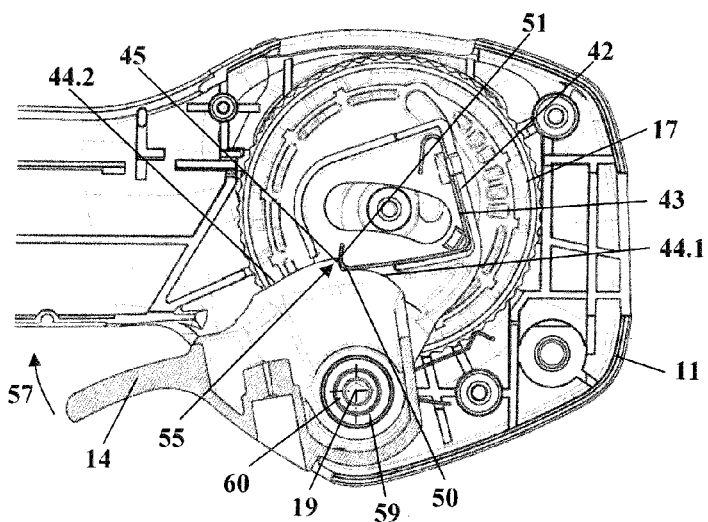
FIG. 6 shows the section view from FIG. 4 with a throttle lever arranged at the intermediate stop.

FIG. 6 shows the arrangement upon further actuation of the throttle lever 14. The throttle lever 14 is pushed in the actuating direction 57 in FIG. 6 until the intermediate stop 55 is reached. The intermediate stop 55 is formed by the second abutment region 51 and the stop surface 45. The first abutment region 50 also abuts against the throttle lever 14, specifically in the first section 44.1 of the sliding surface 44, when the intermediate stop 55 is reached. The position of the setting element 17 remains unchanged with respect to the position shown in FIGS. 4 and 5. As a result, the spring 43 is held in a fixed position with respect to the handle housing 10. The throttle lever 14 moves with respect to the handle housing 10 and with respect to the spring 43.

Figure 7:
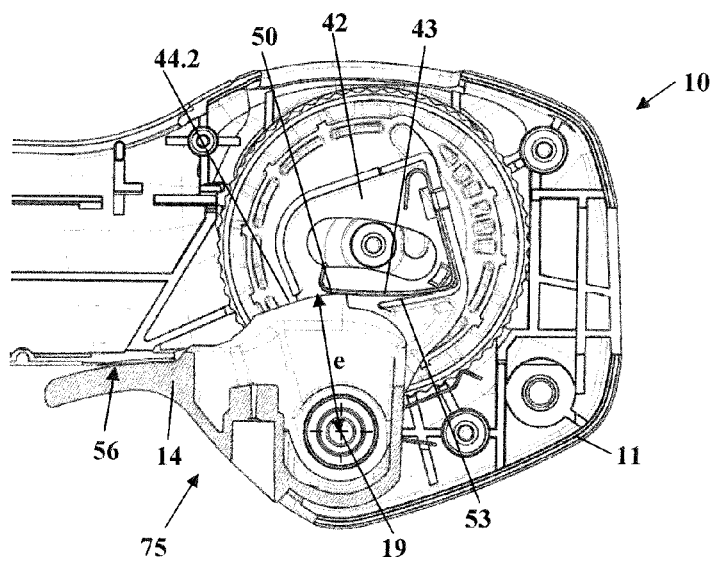
FIG. 7 shows the section view from FIG. 4 in the maximum position of the throttle lever.

FIG. 7 shows the throttle lever 14, following further actuation in the actuating direction 57 (FIG. 6), in the maximum position 75, in which the throttle lever 14 abuts against an end stop 56 formed on the handle housing 10. In this position, the first abutment region 50 of the spring 43 abuts against the second section 44.2 of the sliding surface 44. The spring 43 has moved away from the abutment web 53, specifically on account of the increased distance of the second section 44.2 of the sliding surface 44 from the pivot axis 19. The section 44.2 is at a constant distance (e) from the rotational axis 19 over its entire length. As a result, the spring 43 is not deformed further in the event of a movement of the throttle lever 14 during which the spring 43 abuts against the second section 44.2 of the sliding surface 44.

Figure 8:
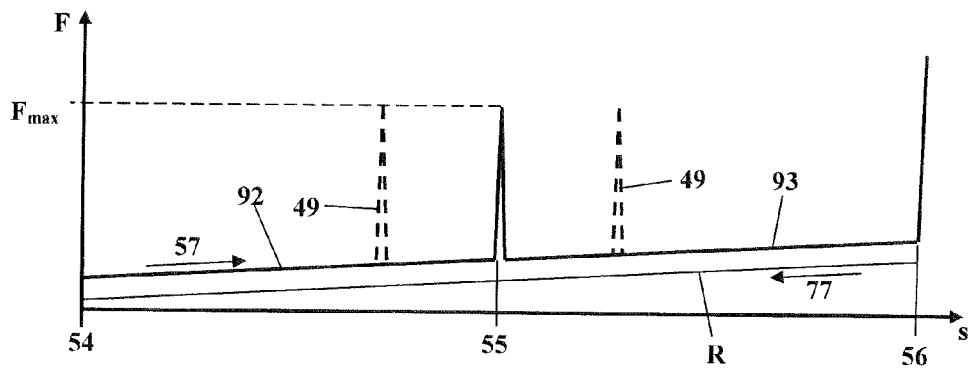
FIG. 8 shows a diagram schematically showing the profile of the operating force along the actuating path.

FIG. 8 shows the profile of the operating force F along the operating travel (s) of the throttle lever 14. Upon actuation of the throttle lever 14, the operating force F initially increases in a linear manner in the actuating direction 57 starting from the zero stop 54, as the line 92 shows. The increase in the operating force F is determined substantially by the restoring spring 33 and optionally by a further restoring spring of the throttle flap 23. The spring 43 acts on the sliding surface 44 approximately in the direction of the pivot axis 19 and as a result exerts no moment on the throttle lever 14. However, a different profile of the sliding surface 44 or a different orientation of the spring 43, which exerts an additional moment on the throttle lever 14 in the direction of its zero position 74 (FIG. 5), may also be advantageous. When the intermediate stop 55 is reached, the operating force F increases very strongly to a maximum operating force $F_{max}$. The increase in the operating force F arises on account of the elastic deformation of the spring 43 at the stop surface 45. Since the stop surface 45 is oriented very steeply with respect to the direction of movement 73 (FIG. 5) and as a result only a small proportion of the actuating force F acts in the direction required for the elastic deformation of the spring 43, a very high maximum operating force $F_{max}$ arises. Over the angle $\beta$ or the corresponding angle $\alpha$, the magnitude of the maximum operating force $F_{max}$ can be fixed in structural terms. As soon as the first abutment region 50 of the spring 43 abuts against the second section 44.2 of the sliding surface 44, the operating force F drops again strongly. In the exemplary embodiment shown, the operating force drops to a value which is located more or less in continuation of the characteristic from the zero stop 54 to the intermediate stop 55. The operating force F increases further in a linear manner until the end stop 56 is reached, as the line 93 shows. The line 93 is in this case located in the exemplary embodiment in continuation of the line 92 and has the same pitch as the line 92.

As is indicated by way of the dashed lines 49 in FIG. 8, the position of the intermediate stop 55 can be adjusted, specifically by rotating the setting element 17. Advantageously, the position of the intermediate stop 55 can be adjusted in the entire region between the zero stop 54 and the end stop 56. The design is in this case advantageously selected such that the position of the intermediate stop 55 can be set during operation. Advantageously, the throttle lever 14 can be adjusted via the setting element 17 with the spring 43 abutting against the intermediate stop 55. As a result, the position of the intermediate stop 55 can be set simultaneously with the desired throttle lever position during operation.

FIG. 8 also shows the restoring force R on the throttle lever 14, the restoring force R being applied by the restoring spring 33, when the throttle lever 14 is released and moves in the opposite direction 77 to the actuating direction 57. The restoring force R extends in a linear manner, and the spring constant of the restoring spring 33 is accordingly constant. On account of the intermediate stop 55, no additional restoring force R is exerted before or after the intermediate stop 55. Advantageously, the intermediate stop 55 itself does not exert any additional restoring force R on the throttle lever 14, either.

Figure 9:
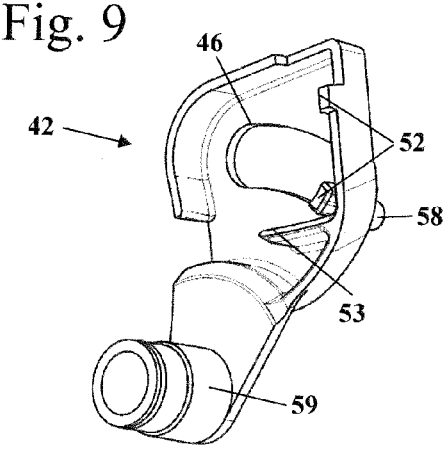
FIGS. 9 and 10 show perspective views of the retaining element of the work apparatus.
Figure 10:
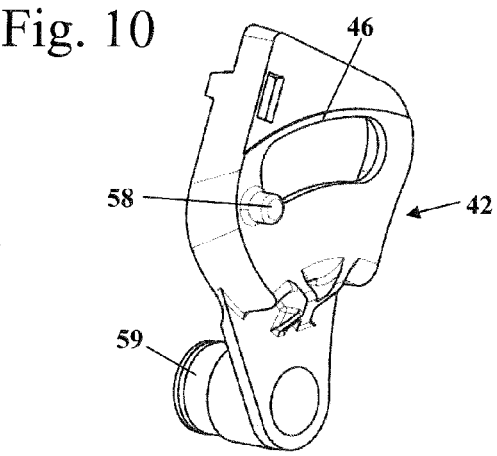

FIGS. 9 and 10 show the design of the retaining element 42 in detail. The retaining element 42 has a bearing pin 59 which, as FIG. 6 shows, passes through the throttle lever 14 and serves as a bearing for the throttle lever 14. The bearing pin 59 is for its part mounted on a housing pin 60, likewise shown in FIG. 6. FIGS. 9 and 10 also show the positioning lug 58, which projects into the positioning groove 40.

Figure 11:
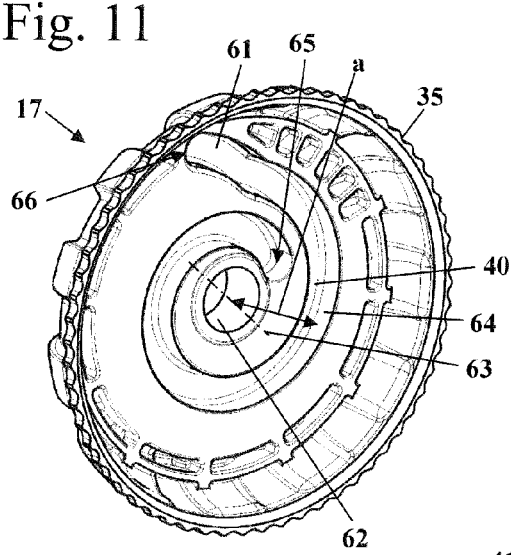
FIGS. 11 and 12 show perspective views of the setting element of the work apparatus.
Figure 12:
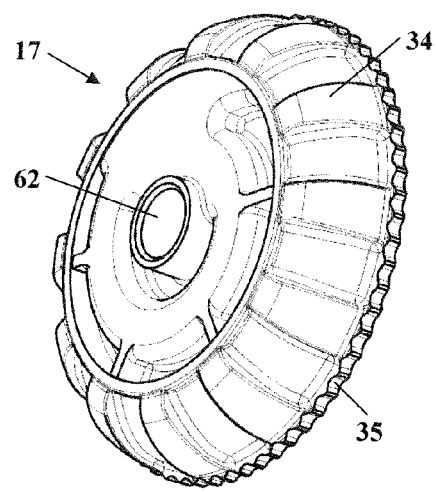

FIGS. 11 and 12 show the setting element 17. The setting element 17 is formed in an approximately shell-like manner. The region of the retaining element 42, which retains the spring 43, the positioning lug 58 and the region which has the guide slot 46 are arranged within the space enclosed by the periphery of the setting element 17. This results in a small overall size of the arrangement. The setting element 17 is mounted so as to be rotatable about a rotational axis 63, which is also shown in FIG. 4. The setting element 17 has a bearing opening 62 which surrounds the rotational axis 63 and into which a bearing pin (not shown) of the handle housing 10 projects. On the side facing the retaining element 42, the setting element 17 has the positioning groove 40. The positioning groove 40 extends in a spiral manner around the rotational axis 63. The positioning groove 40 has an inner end 65 and an outer end 66. Adjacent to the outer end 66, the positioning groove 40 has an end section 61 in which the positioning groove 40 extends more steeply, that is, is inclined more steeply with respect to the tangential direction about the rotational axis 63. As a result, the intermediate stop 55 cannot be fixed in a region directly before the full throttle position of the throttle lever 14 is reached. The orientation of the end section 61 is selected such that the throttle lever pushes the intermediate stop 55 into its end position when the positioning lug 58 is arranged in the end section 61.

The positioning groove 40 has an outer wall 64 against which the positioning lug 58 (FIG. 9) is pushed when the intermediate stop 55 is overpushed. The outer wall 64 is at a distance (a) from the rotational axis 63, the distance (a) increasing continuously from the inner end 65 to the outer end 66. The change in the distance (a) is in this case so small that the spring 43 is arranged in a fixed position in normal operation and is elastically deformed at the intermediate stop 55. The force exerted by the spring 43 on the setting element 17 in the direction of rotation of the setting element 17 at the intermediate stop 55 is too low and the frictional forces that act are too high to rotate the setting element 17.

Figure 13:
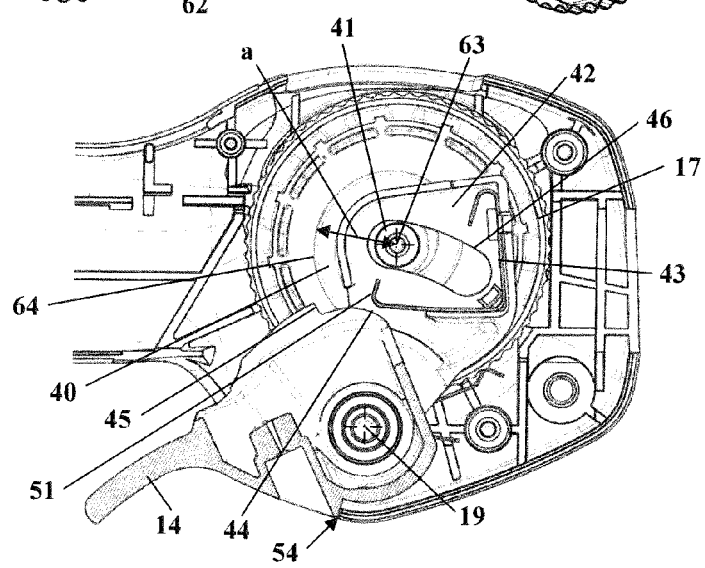
FIG. 13 shows the section view from FIG. 4 with the intermediate stop adjacent to the maximum position.
Figure 14:
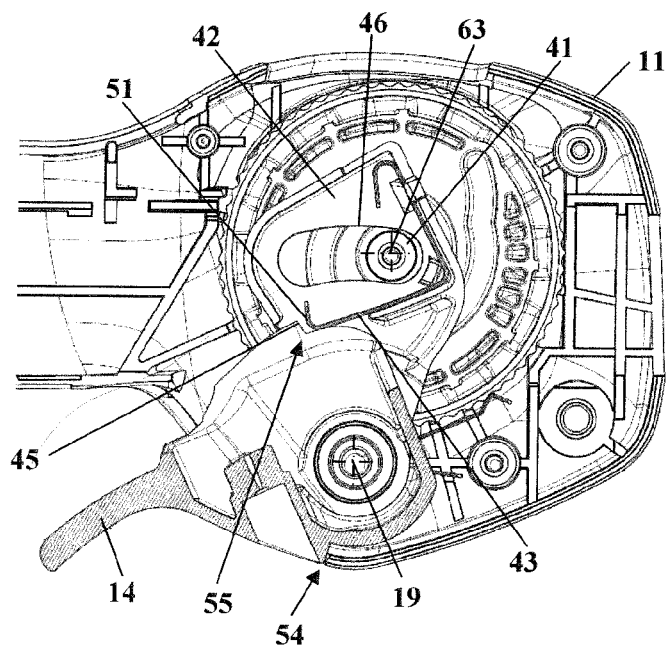
FIG. 14 shows the section view from FIG. 4 with the intermediate stop adjacent to the zero position.

FIG. 13 shows the device in a position in which the intermediate stop 55 is in a position which corresponds to the full throttle position. The full throttle position is in this case the position of the throttle lever 14 in which the throttle lever 14 abuts against the end stop 56. The positioning lug 58 (FIGS. 9 and 10) is located at the outer end 66 of the positioning groove 40 (FIG. 11). The guide pin 41 is arranged adjacent to one end of the guide slot 46.

FIG. 13 shows the intermediate stop 55 in a position adjacent to a position which corresponds to the idling position of the throttle lever 14. The idling position of the throttle lever 14 is in this case the position in which the throttle lever 14 abuts against the zero stop 54. The positioning lug 58 (FIGS. 9 and 10) is arranged adjacent to the inner end 65 of the positioning groove 40 (FIGS. 11 and 12). As soon as the throttle lever 14 is actuated a little, the second abutment region 51 comes into contact with the stop surface 45. The guide pin 41 is located at the other end of the guide slot 46.

Figure 15:
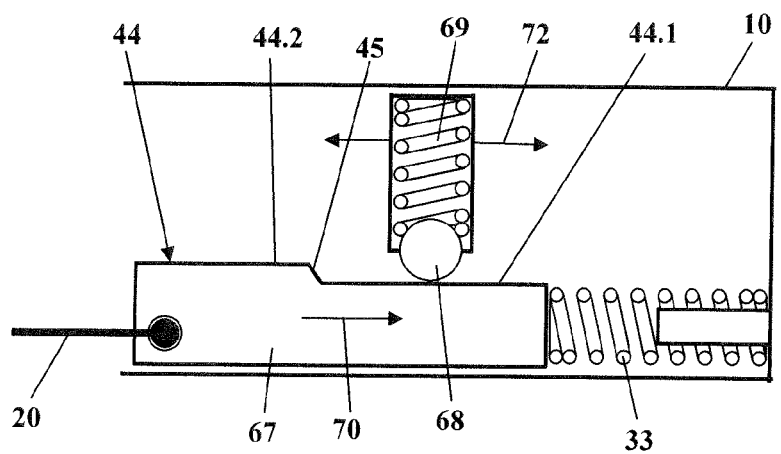
FIGS. 15 and 16 show schematic views of embodiments of the operator-actuated device.
Figure 16:
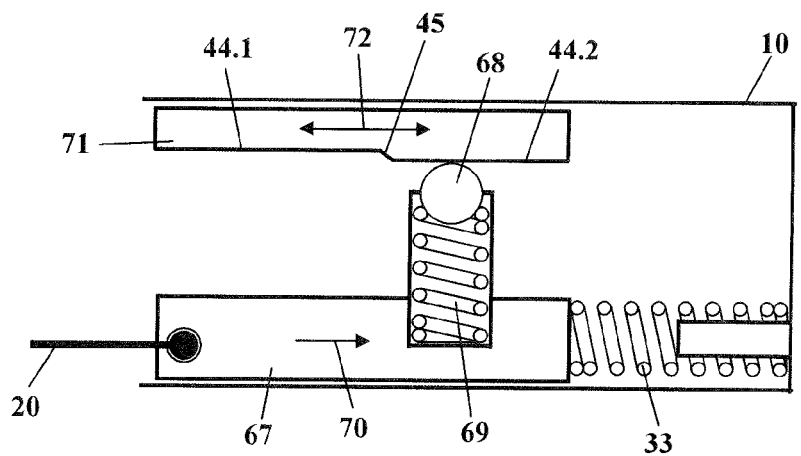

FIGS. 15 and 16 show exemplary embodiments of the design of an intermediate stop 55, in the case of which, rather than a pivotably mounted throttle lever 14, a slider 67 is provided. In this case, the slider 67 may be intended to be actuated directly by the operator or a pivotable throttle lever acts on a linearly displaceable slider 67. For the purpose of acceleration, the slider 67 is displaceable in an actuating direction 70, specifically counter to the force of a restoring spring 33 which is illustrated as a helical compression spring in the schematic illustrations in FIGS. 15 and 16.

In the exemplary embodiment according to FIG. 15, the slider 67 has the sliding surface 44 having the two sections 44.1 and 44.2 and the stop surface 45. A sprung element, namely a ball 68, is arranged in the handle housing 10 so as to be displaceable in the direction of an arrow 72. The ball 68 is sprung by a compression spring 69. When the slider 67 is actuated, the ball 68 comes into contact with the stop surface 45. As a result, the operating force F for displacing the slider 67 further increases strongly. After the stop surface 45 has been overcome, the ball 68 abuts against the second section 44.2 of the sliding surface 44. The sections 44.1 and 44.2 of the sliding surface 44 extend parallel to the actuating direction 70, such that here only a small operating force, which is generated substantially by the restoring spring 33, arises. A different design of the sprung element may also be advantageous.

In FIG. 16, the ball 68 is arranged on the slider 67 by way of the compression spring 69 and the sliding surface 44 is formed on a sliding piece 71 which is mounted in the handle housing 10 so as to be displaceable in the direction of an arrow 72. Here, a corresponding increase and, after the intermediate stop 55 has been overcome, a corresponding drop in the operating force F arise. In the exemplary embodiments according to FIGS. 15 and 16, the stop surface 45 likewise forms a ramp, such that the stop is not effective in the opposite direction to the actuating direction 70, that is, when the slider 67 is released.

Figure 17:
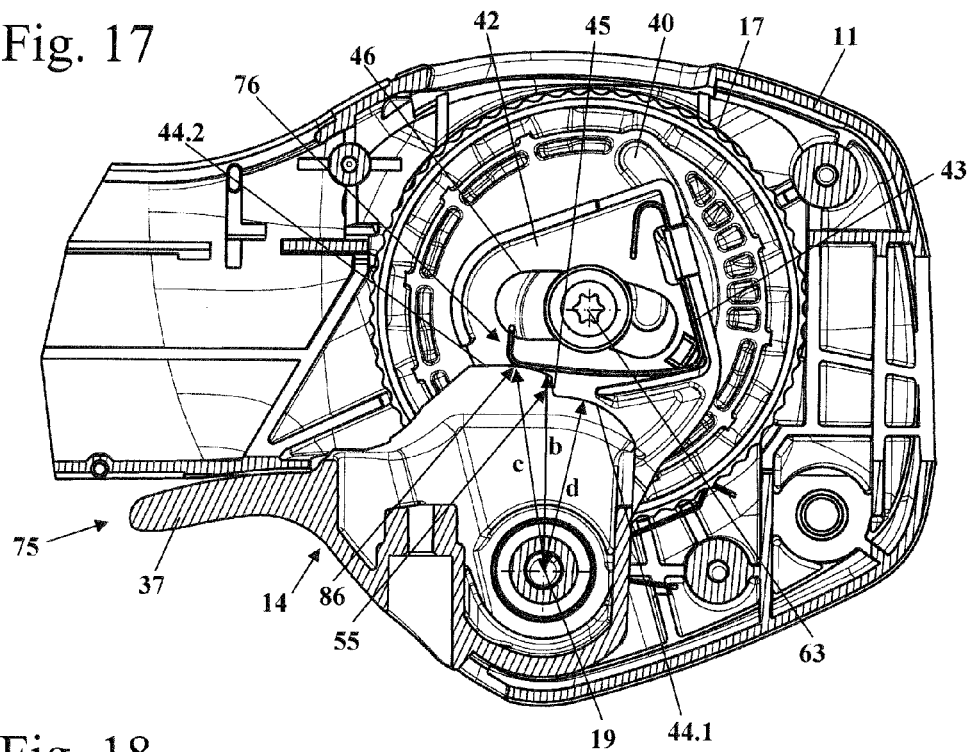
FIG. 17 shows a section view through an embodiment of a handle in the region of the throttle lever in the maximum position of the throttle lever.

FIG. 17 shows an exemplary embodiment of the throttle lever 14 in the maximum position 75. This position corresponds to the position shown in FIG. 7 for the first exemplary embodiment. Identical reference signs to those in the preceding figures characterize mutually corresponding elements. The structure of the handle 4 shown in FIG. 17 corresponds to that of the handle 4 from FIGS. 2 to 14. The handle 4 shown in FIG. 17 differs from the handle of FIGS. 2 to 14 by way of the design of the sliding surface 44 of the throttle lever 14. The first section 44.1 of the sliding surface 44 is configured in a manner corresponding to the design shown in FIGS. 2 to 14 and has a profile in the form of a circular arc around the pivot axis 19. The distance (d) of the sliding surface 44.1 from the rotational axis 19 is constant. The second section 44.2 of the sliding surface 44, against which the spring 43 abuts after overcoming the intermediate stop 55, has a deviating profile. From the intermediate stop 55 to the abutment point 86, against which the spring 43 abuts in the maximum position 75 of the throttle lever 14, the section 44.2 becomes increasingly distant from the pivot axis 19. Immediately after the intermediate stop 55, the section 44.2 of the sliding surface 44 is at a distance (b) from the pivot axis 19. The abutment point 86, against which the spring 43 abuts in the maximum position 75 of the throttle lever 14, is at a distance (c) from the pivot axis 19, the distance (c) being greater than the distance (b). The distance of the sliding surface 44.2 from the pivot axis 19 increases continuously from the distance (b) to the distance (c). As a result, when the throttle lever 14 is moved, the spring is increasingly tensioned as far as the maximum position 75 after the intermediate stop 55 has been overcome. The operating force F which is required to adjust the throttle lever 14 by a given adjustment travel (s) (FIG. 18), that is, to pivot the throttle lever 14 about a given adjustment angle, is smaller before the intermediate stop 55 is reached than after the intermediate stop 55 has been reached.

The second section 44.2 of the sliding surface 44 does not extend in a parallel manner, that is, at a tangent to the direction of movement 73 of the sliding surface 44 at every point of the sliding surface 44, but is inclined with respect to the direction of movement 73. This is shown in an enlarged manner in FIG. 20. The tangent to the sliding surface 44 in the section 44.2 encloses an angle δ with the direction of movement 73 of the sliding surface 44. The angle δ may advantageously be about 3° to about 30°. The larger the angle δ, the greater the restoring force R which is exerted on the throttle lever 14. As FIG. 20 also shows, the spring 43 acts on the sliding surface 44 in a perpendicular manner. The spring exerts on the sliding surface 44 a force 90, the direction of action of which is at a distance (f) from the pivot axis 19. As a result, the spring 43 exerts on the throttle lever 14 a moment which acts counter to the actuating direction 57 (FIG. 6).

Figure 18:
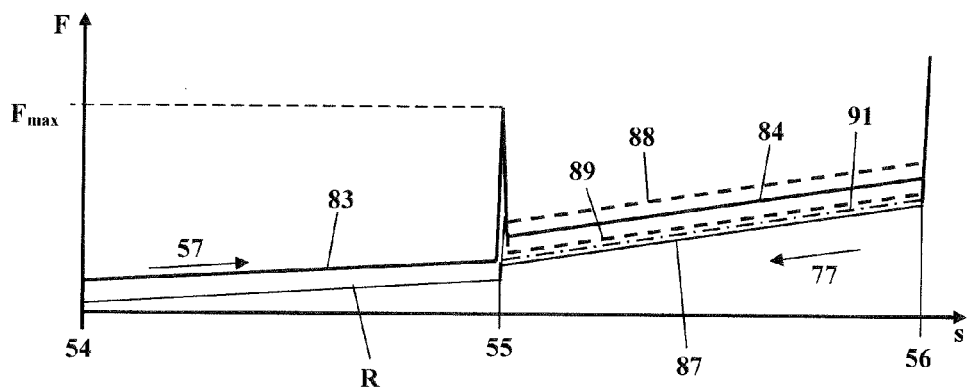
FIG. 18 shows a diagram which schematically shows the profile of the operating force along the actuating path for the embodiment according to FIG. 17.

FIG. 18 shows the profile of the actuating force for the exemplary embodiment shown in FIG. 17. A first line 83 shows the profile of the operating force F up to the intermediate stop. Until the intermediate stop 55 is reached, the operating force F increases in a linear manner and with a low pitch. At the intermediate stop 55, a very strong increase in force, up to a maximum operating force $F_{max}$, occurs on account of the steep, ramp-like stop surface 45. This corresponds to the force profile of the preceding exemplary embodiments. After the intermediate stop 55 has been overcome, the operating force F drops to a value which is above the linear continuation of the line 83. The operating force F does not fall back to the continuation of the line 83 after the intermediate stop 55 has been overcome, since the spring 43 exerts an additional moment on the throttle lever 14 over the force 90, the additional moment acting counter to the actuating force F. The operating force F increases more strongly until the end stop 56 is reached. This is indicated by a line 84, the pitch of which is greater than that of the line 83. On account of the increased required operating force F in the second section 44.2 of the sliding surface 44, that is, after the intermediate stop 55 has been overcome, the operator is provided with much clearer feedback showing that the intermediate stop 55 has already been overcome. After the intermediate stop 55 has been overcome, that is, when the spring 43 is in abutment in the second section 44.2, the restoring force R is much greater than before the intermediate stop 55 is reached. This is shown by the line 87. Provision may also be made for the line 84 to drop back to the continuation of the line 83 after the intermediate stop 55 has been achieved, and to have a greater pitch than the line 83. This is indicated by the dot-dashed line 91. The desired characteristic of the profile of the operating force F and the restoring force R can be set by a suitable design of the second section 44.2 of the sliding surface 44.

When the throttle lever 14 is released, a restoring force R arises which extends parallel to the lines 84 and 83. The restoring force R restores the throttle lever 14 to its zero position 74 (FIG. 4). The restoring force R is illustrated by a line 87 for the region between the intermediate stop 55 and the end stop 56.

Figure 19:
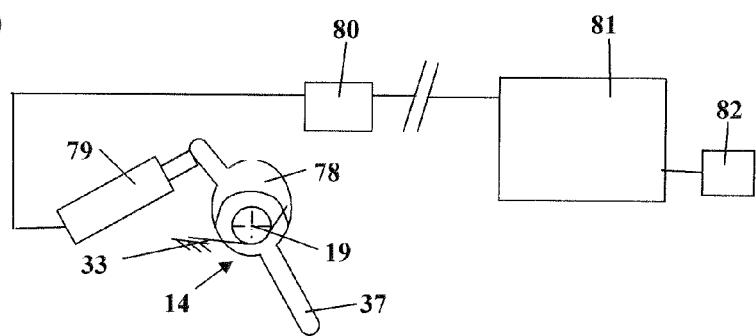
FIG. 19 shows a schematic view of an embodiment of the operating device and of the drive motor of the brushcutter.

FIG. 19 schematically shows an exemplary embodiment in which the throttle lever 14 acts on an electric motor 81. The throttle lever 14 includes the actuating section 37 which is connected to an actuating section 78 in an adjustable manner. The adjustment can take place in a manner corresponding to the exemplary embodiment shown in FIGS. 3 and 4 via a setting screw 39. However, provision may also be made for the actuating sections 37 and 78 to be connected fixedly together or for the throttle lever 14 to be formed in one part. The actuating section 78 acts on a potentiometer 79 which is connected to a control device 80. Depending on the position of the throttle lever 14, the signal emitted by the potentiometer 79 to the control device 80 varies. The control device 80 controls the electric motor 81 in a corresponding manner. The electric motor 81 is connected to a power supply 82 which may be for example a battery, a storage battery or a power cable for connecting to an external power supply. All of the exemplary embodiments shown can be used both with a combustion engine 27 and with an electric motor 81.

Figure 20:
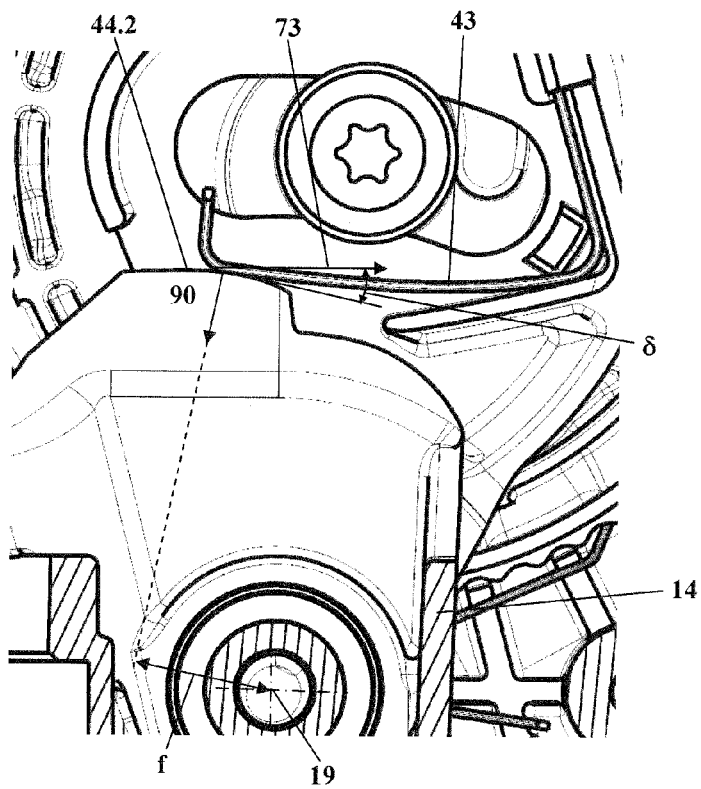
FIG. 20 shows an enlarged detail from FIG. 19.
Figure 21:
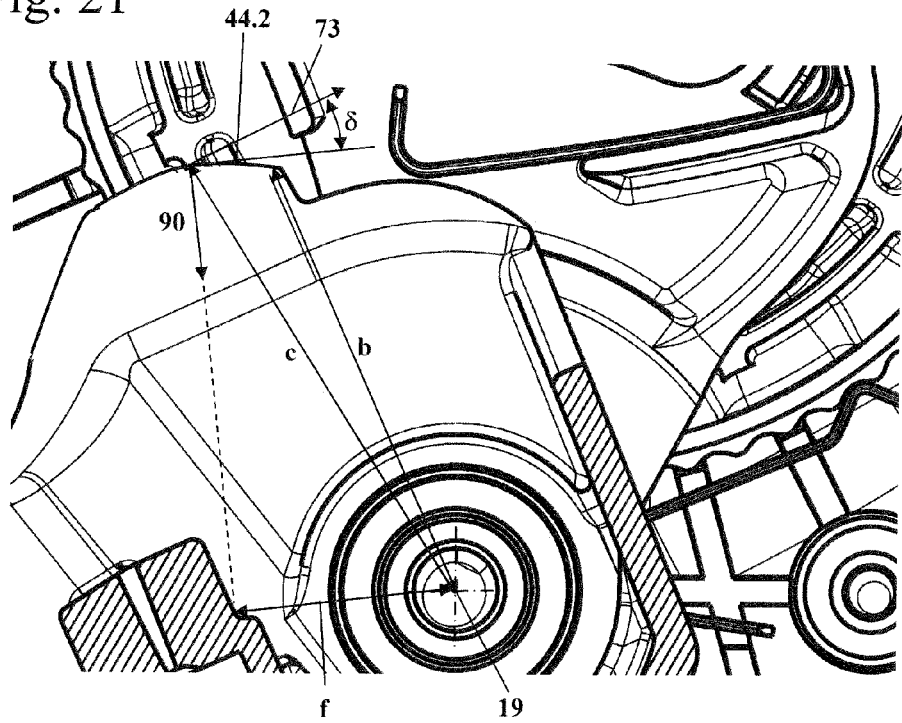
FIG. 21 shows a further embodiment of a handle in a section view corresponding to FIG. 5.

FIG. 21 shows an exemplary embodiment for the section 44.2 of the sliding surface 44. The sliding surface 44 is inclined at an angle δ, which is much greater than the angle δ shown in FIG. 17, to the direction of movement 73 in the second section 44.2. As a result, in the exemplary embodiment shown in FIG. 21, a greater operating force F and a greater restoring force R on the throttle lever 14 arise when the spring 43 is in abutment in the second section 44.2. The force 90 which the spring 43 exerts on the sliding surface 44 in the maximum position 75 (FIG. 17) does not act in the direction of the pivot axis 19 but at a distance (f) from the pivot axis 19 and as a result exerts a moment counter to the actuating direction 57 (FIG. 4) on the throttle lever 14. As FIGS. 20 and 21 show, the distance (f) is greater in the exemplary embodiment shown in FIG. 20 than in the exemplary embodiment shown in FIG. 21. This produces the greater operating force F and a greater restoring force R.

The profile of the operating force F between the intermediate stop 55 and the end stop 56 is indicated by way of a dashed line 88 in FIG. 18. In the exemplary embodiment, the line 88 extends in a manner parallel to the line 84. The line 88 is offset in the direction of higher forces F in a manner parallel to the line 84. The restoring force R between the intermediate stop 55 and the end stop 56 is shown by way of a dashed line 89 in FIG. 18. The line 89 also extends above the line 87.

Accordingly, the restoring force R is also greater in the exemplary embodiment shown in FIG. 21 than in the exemplary embodiment shown in FIG. 17. The distance (c) between the pivot axis 19 of the throttle lever 14 and the region of the sliding surface 44, against which the spring 43 abuts in the maximum position 75 (FIG. 17) of the throttle lever 14, is greater than the distance (c) shown in FIG. 17. The profile of the second section 44.2 of the sliding surface 44 is in this case selected such that the moment acting on the throttle lever 14 is constant in the restoring direction, that is, counter to the actuating direction 57 shown in FIG. 4.

Apart from the design of the second section 44.2, the exemplary embodiment shown in FIG. 21 corresponds to the exemplary embodiments shown in the preceding figures.

The line (84, 88, 91, 93), which is specified by the operating force F with respect to the adjustment travel (s), can have the same or a different, in particular greater pitch in the region between the intermediate stop 55 and the end stop 56 than the lines (83, 92), which are specified by the profile of the operating force F along the adjustment travel (s) in the region between the zero stop 54 and the intermediate stop 55. The line (84, 88) may be offset in the direction of greater operating forces F with respect to the line 83. However, provision may also be made for the line 93, which is specified by the operating force F with respect to the adjustment travel (s) in the region between the intermediate stop 55 and the end stop 56, to extend in continuation of the line 92. The line 92 in this case specifies the operating force F with respect to the adjustment travel (s) in the region between the zero stop 54 and the intermediate stop 55. Provision may also be made for the operating force F to be constant in the region between the intermediate stop 55 and the end stop 56. This can be achieved by an orientation of the sliding surface 44 in which the spring 43 generates a moment which acts counter to the force exerted by the restoring spring 33 (FIG. 3).

It is understood that the foregoing description is that of the preferred embodiments of the invention and that various changes and modifications may be made thereto without departing from the spirit and scope of the invention as defined in the appended claims.

What is claimed is:

1. A work apparatus comprising:
a work tool;
a drive motor configured to drive said work tool;
a control unit for said drive motor having an actuating element for actuation by a user;
a housing;
said actuating element having an actuating direction and being movably mounted in said housing via an application of an actuating force (F);
said actuating element being configured to be displaceable from a zero position up to a maximum position;
a setting element;
an intermediate stop configured to act at a position between said zero position and said maximum position;
said setting element being configured to set said position of said intermediate stop; and,
said actuating element being further configured to interact with said intermediate stop so as to cause said actuating force (F) to increase when said actuating element reaches said intermediate stop and decrease once said intermediate stop is overcome with further actuation of said actuating element toward said maximum position.

2. The work apparatus of claim 1, wherein said actuating force (F), after said intermediate stop has been overcome, is less than half of a maximum of said actuating force (F) which is required when overcoming said intermediate stop.

3. The work apparatus of claim 1, wherein:
said intermediate stop includes a first stop element connected to said actuating element and a second stop element connected to said housing;
said actuating element defines an actuating path from said zero-position to said maximum position; and,
said first and said second stop element is configured to move relative to each other over the entire actuating path of said actuating element.

4. The work apparatus of claim 3, wherein one of said first and second stop elements is a spring element and the other one of said first and second stop elements is a stop surface.

5. The work apparatus of claim 4, wherein:
said spring element defines a direction of movement; and,
said stop surface is configured to be at an angle ($\beta$) of more than 45° to said direction of movement when said spring element reaches said stop surface.

6. The work apparatus of claim 4 further comprising:
a slide surface having a first slide surface section disposed ahead of said stop surface with respect to said actuating direction and a second slide surface section disposed behind said stop surface with respect to said actuating direction;
said spring element being configured to slide off said slide surface when said actuating element is actuated; and,
said stop surface being configured to form a ramp between said first and said second slide surface sections.

7. The work apparatus of claim 6, wherein:
said sliding surface defines a slide surface movement direction; and,
said first and said second slide surface sections run approximately parallel to said slide surface movement direction.

8. The work apparatus of claim 6, wherein:
said slide surface defines a slide surface movement direction wherein said slide surface moves relative to said spring element when said actuating element is actuated; and,
said second slide surface section is inclined with respect to said slide surface movement direction.

9. The work apparatus of claim 8, wherein:
said slide surface is pivotally mounted about a pivot axis;
said spring element and said slide surface are configured to conjointly define a contact point at which said spring element contacts said slide surface;
said pivot axis and said contact point define a distance (b, c) from each other; and,
said actuating element is configured to continually increase said distance (b, c) in said second slide surface section when said actuating element moves in said movement direction.

10. The work apparatus of claim 3 further comprising:
a positioning gear assembly; and,
said setting element being configured to act on at least one of said first and said second stop elements via said positioning gear assembly.

11. The work apparatus of claim 10, wherein said positioning gear assembly has a positioning lug guided in a positioning groove.

12. The work apparatus of claim 11, wherein said positioning groove runs in a spiral shape.

13. The work apparatus of claim 11, wherein said positioning groove is formed in said setting element; and, said positioning lug is fixedly connected to one of said first and said second stop elements.

14. The work apparatus of claim 10, wherein:
said setting element is configured to act on said second stop element; and,
said second stop element is configured to be movable in said actuation direction to adjust the position of said intermediate stop.

15. The work apparatus of claim 14, wherein:
said actuating element is pivotally mounted about an actuating element pivot axis; and,
said second stop element is pivotal about said actuating element pivot axis to shift the position of said intermediate stop.

16. The work apparatus of claim 3, further comprising:
a transfer element;
said actuating element being a throttle lever having an actuating section configured to be actuated by a user and a fastening section;
said transfer element being fixed to said fastening section and being configured to transfer a positioning movement of said throttle lever to said drive motor;
said actuating section and said fastening section having setable relative positions; and,
one of said first and said second stop elements being fixed to said actuating section.

17. The work apparatus of claim 1, wherein said setting element is configured to be adjustable to a position independent of the position of said actuating element.

18. The work apparatus of claim 1, wherein:
said actuating element is resiliently biased in the direction of said zero position; and,
said actuating force (F) required to move said actuating element along a displacement path (s) before said actuating element reaches said intermediate stop is approximately equal to said actuating force (F) required to move said actuating element along said displacement path (s) after said intermediate stop has been overcome.

19. The work apparatus of claim 1, wherein:
said actuating element is resiliently biased toward said zero position; and,
said actuating force (F) required to move said actuating element along a displacement path (s) before said actuating element reaches said intermediate stop is less than said actuating force (F) required to move said actuating element along said adjustment path (s) after said intermediate stop has been overcome.

\* \* \* \* \*